(12) United States Patent
Moreau et al.

(10) Patent No.: US 8,051,188 B2
(45) Date of Patent: Nov. 1, 2011

(54) METHOD OF PROPOSING A SERVICE VIA A DESCRIPTION DOCUMENT OF SUCH A SERVICE

(75) Inventors: Jean-Jacques Moreau, Rennes (FR); Hervé Ruellan, Rennes (FR); Youenn Fablet, La Dominelais (FR)

(73) Assignee: Canon Kabushiki Kaisha, Tokyo (JP)

( * ) Notice: Subject to any disclaimer, the term of this patent is extended or adjusted under 35 U.S.C. 154(b) by 945 days.

(21) Appl. No.: 10/654,003

(22) Filed: Sep. 4, 2003

(65) Prior Publication Data

US 2004/0128369 A1 Jul. 1, 2004

(30) Foreign Application Priority Data

Sep. 5, 2002 (FR) ..................................... 02 10989
Sep. 5, 2002 (FR) ..................................... 02 10992

(51) Int. Cl.
*G06F 15/16* (2006.01)
(52) U.S. Cl. ........................................ 709/230; 709/219
(58) Field of Classification Search .................... 709/230
See application file for complete search history.

(56) References Cited

U.S. PATENT DOCUMENTS

| | | | |
|---|---|---|---|
| 5,774,673 A | 6/1998 | Beuk et al. ................ 395/200.66 |
| 6,170,081 B1 | 1/2001 | Fontana et al. | |
| 6,496,843 B1 | 12/2002 | Getchius et al. | |
| 6,691,104 B1 | 2/2004 | Kraft et al. | |
| 6,816,871 B2 | 11/2004 | Lee | |
| 6,826,597 B1 | 11/2004 | Lonnroth et al. | |
| 6,961,760 B2 * | 11/2005 | Li et al. ......................... 709/223 |
| 7,073,120 B2 | 7/2006 | Torii et al. | |
| 7,117,504 B2 * | 10/2006 | Smith et al. ................... 709/227 |
| 7,159,007 B2 * | 1/2007 | Stawikowski ................. 709/202 |
| 7,159,224 B2 * | 1/2007 | Sharma et al. ................ 719/310 |
| 7,167,920 B2 * | 1/2007 | Traversat et al. ............. 709/230 |
| 7,251,674 B2 * | 7/2007 | Banerjee et al. ............. 709/230 |
| 7,386,860 B2 * | 6/2008 | Dani et al. .................... 719/315 |
| 7,437,710 B2 * | 10/2008 | Bau et al. ...................... 719/330 |

(Continued)

FOREIGN PATENT DOCUMENTS

CA 2369797 A1 * 7/2003

(Continued)

OTHER PUBLICATIONS

W3C, Web Services Description Language (WDSL) 1.1, Mar. 15, 2001, p. 12, Section 2.1.3, <http://www.w3c.org/TR/wsdl>.*

(Continued)

*Primary Examiner* — Jeffrey R Swearingen
(74) *Attorney, Agent, or Firm* — Fitzpatrick, Cella, Harper & Scinto

(57) ABSTRACT

A server computer sends, to a client computer, a service description document comprising information relating to a communication protocol used for exchanging messages, the service description document including a description of at least one functionality implemented by the communication protocol for an execution of the service over on the communication network using the protocol. The client computer analyzes the service description document by extracting the description of the functionalities implemented by the protocol from the service description document, verifying that each functionality is supported by the client computer of the communication network, and adding the protocol to a list of protocols usable for the execution of the service supplied by the server computer if all the functionalities associated with the communication protocol are supported by the client computer.

25 Claims, 10 Drawing Sheets

U.S. PATENT DOCUMENTS

| | | | |
|---|---|---|---|
| 7,493,397 B1 * | 2/2009 | Guthrie et al. | 709/227 |
| 7,496,637 B2 * | 2/2009 | Han et al. | 709/217 |
| 7,730,204 B2 * | 6/2010 | Pak | 709/238 |
| 2002/0046239 A1 * | 4/2002 | Stawikowski et al. | 709/203 |
| 2002/0120685 A1 | 8/2002 | Srivastava et al. | |
| 2002/0129024 A1 | 9/2002 | Lee | |
| 2002/0143819 A1 | 10/2002 | Han et al. | |
| 2002/0147746 A1 | 10/2002 | Lee | |
| 2003/0055748 A1 | 3/2003 | Bezrukov et al. | |
| 2003/0055916 A1 | 3/2003 | Fablet et al. | |
| 2003/0084078 A1 | 5/2003 | Torii et al. | |
| 2003/0093574 A1 | 5/2003 | Fablet et al. | |
| 2003/0115119 A1 | 6/2003 | Schleicher | |
| 2004/0117733 A1 | 6/2004 | Moreau et al. | |
| 2004/0122747 A1 | 6/2004 | Jimenez et al. | |

FOREIGN PATENT DOCUMENTS

| | | |
|---|---|---|
| EP | 1 221 818 | 7/2002 |
| EP | 1 229 442 | 8/2002 |
| EP | 1229442 A2 * | 8/2002 |
| WO | WO 02/01833 | 1/2002 |

OTHER PUBLICATIONS

NNRD455132. "Method of Enabling Automated Invocation of Web Services." IBM Technical Disclosure Bulletin. Mar. 2002, UK. Issue 455, p. 492. Mar. 1, 2002.*

U.S. Appl. No. 10/654,023, filed Sep. 4, 2003, Moreau et al.

F. Cohen, "Testing Net Web services", The Institution of Electrical Engineers, Stevenage, Great Britain. Feb. 2002.

E. Christensen, et al., "Web Services Description Language (WSDL) 1.0", Sep. 25, 2000. <URL:http://www-4.ibm.com/software/developer/library> (visited Sep. 25, 2000).

D. Box, et al., "Simple Object Access Protocol (SOAP) 1.1.", May 8, 2000, p. 22, line 23 to p. 25, line 16. <URL:http://www.w3.org> (visited Feb. 22, 2001).

"SOAP Version 1.2 Part 1: Messaging Framework", W3C Working Draft Jun. 26, 2002, <http://www.w3.org/TR/2002/WD-soap12-part1-20020626/> sited visited Mar. 26, 2004.

E. Christensen, et al., "Web Services Description Language (WSDL) 1.1", W3C Note Mar. 15, 2001. <http://www.w3.org/TR/2001/NOTE-wsdl-20010315>, sited visited Mar. 26, 2004.

M. Rose, "The Blocks Extensible Exchange Protocol Core", Invisible Worlds, Inc., Mar. 2001. <http://www.ietf.org/rfc/rfc3080.txt>, site visited Mar. 26, 2004.

A. Lewis, Concrete syntax proposal [Was: Re: Description of scenarios], Feb. 26, 2003, pp. 1-3, <URL:http://lists.w3.org/Archives/Public/publics-ws-pnf-tf/2003Feb/0058.html>, site visited Nov. 7, 2003.

J. Moreau, "Re: A slice at a proposal for SOAP feature /properties in WSDL", Sep. 26, 2002, pp. 1-3, <URL:http://lists.w3.org/Archives/Public/www-ws-desc/2002Sep/0080.html>, site visited Nov. 7, 2003.

G. Daniels, "Draft Proposal: WSDL Description of SOAP 1.2 Features", Sep. 4, 2002, pp. 1-3, <URL:http://lists.w3.org/Archives/Public/www-ws-desc/2002Sep/att-0004/01-SOAP-feature-proposal.htm>, site visited Nov. 7, 2003.

U.S. Appl. No. 10/790,847, filed Mar. 3, 2004, Youenn Fablet., published as U.S. 2004-0210836 A1.

French Institute National De La Propriete Industrielle, Nov. 10, 2003.

* cited by examiner

Figure 4a

| Service | Protocol |
|---|---|
| StockQuoteService | http:/www.w3.org/2002/06/soap/bindings/HTTP |
| StockQuoteService | http:/www.crf.canon.fr/2002/05/soap/bindings/HTTP |
| StockQuoteService | http:/www.crf.canon.fr/2002/05/ietf/bindings/HTTP |

Figure 4b

| w3c-soap12-http11 | |
|---|---|
| Functionality | mU |
| request-response | |
| soap-response | |
| web-method | true |

Figure 4c

| request-response | |
|---|---|
| Property | mU |
| reqres:Role | |
| reqres:State | |
| reqres:OutboundMessage | |
| reqres:InboundMessage | |
| reqres:ImmediateDestination | |
| reqres:ImmediateSender | |
| context:ExchangePatternName | |
| context:FailureReason | |

METHOD OF PROPOSING A SERVICE VIA A DESCRIPTION DOCUMENT OF SUCH A SERVICE

The present invention relates to a method of proposing a service provided by a server computer in a communication network.

It also relates to a method of analyzing a service description document by a client computer of a communication network.

It also relates to a method of testing access to a service by a client computer of a communication network on the basis of a service description document, as well as a method of verifying compatibility of a communication protocol on the basis of a service description document.

Within a computer communication network of Internet type, server computers increasingly often offer services to other computers, called client computers, of that communication network.

In practice, the client computer sends data to the server computer which processes them and sends back a result.

Such services are called Web services.

A Web service is a service identified by a URI and accessible via XML and an Internet protocol.

Due to the increase in these services available on a communication network, the protocols for data exchange between computers are frequently standardized.

Thus, the SOAP protocol is a protocol enabling structured information to be exchanged over the Internet network.

According to this SOAP protocol, the information exchanged are structured by means of XML tags(XML being an acronym for "extended Markup Language").

The SOAP standard defines the general structure of the messages exchanged as well as the processing operations having to be performed by a computer sending or receiving SOAP messages.

The SOAP protocol is an extensible protocol, that is to say that the standard only defines the core of the protocol, it being possible to add supplementary functionalities to the protocol.

These supplementary functionalities are called "features". The SOAP standard version 1.2 provides a convention to describe these additional functionalities, this convention relying on the use of properties associated with each functionality.

A description of the SOAP 1.2 standard may be found at "SOAP Version 1.2 Part 1: Messaging Framework" W3C Working Draft, Jun. 26, 2002.

In particular, each property is described by its name, by its type of data, and by the values that it may take.

The description of each functionality comprises, apart from the properties, a model describing how these properties are used on the implementation of that functionality.

This SOAP standard which thus defines the exchanges of information, does not impose any protocol for the transport of SOAP messages over a communication network.

Any protocol capable of transporting a SOAP message may thus be used.

However, as the same protocol may be used in several ways to transport the same SOAP message, it is necessary to define a binding between the SOAP standard and the transport protocol in order to be able to use that transport protocol.

This binding describes in particular how the transport protocol is used to transport a SOAP message. It may furthermore define additional functionalities according to needs linked to the transport protocol.

This type of binding is in particular used when a service is provided by a server computer of the communication network.

A language for describing a computer service, WSDL (acronym for "Web Service Description Language") is thus known which is particularly well-adapted to describe a service on a communication network.

This WSDL language is itself an application of the markup language XML.

A description of the language WSDL 1.1 may be found at "Web Services Description Language (WSDL) 1.1", W3C Note, Mar. 15, 2001.

An electronic document describing a service in WSDL language generally comprises two parts. A first part, called the "abstract part" is adapted to describe the messages exchanged between computers of the communication network when a service is provided.

In particular, this first part makes it possible to define the type of data exchanged, the type of message used on execution of the service, as well as the operations implemented, defined by the messages which are exchanged on execution of the service.

The document describing a WSDL service also comprises a second part adapted to define information relating to the transmission of messages over the communication network.

This second part, called the "concrete part" specifies in particular via a binding the communication protocol which is actually used for the transfer of messages, as well as the format in which the data will be represented for their communication within the communication network.

Thus, such a document describing a WSDL service makes it possible to specify which protocol is used by a Web service. In particular, this document may specify how that protocol must be used or which options of that protocol may or must be used. For example, for the HTTP protocol (HTTP being an acronym for "HyperText Transfer Protocol"), a service description document make it possible to specify which method (for example GET or POST) makes it possible to access such a service.

However, a service description document such as WSDL is limited to the description of a predefined protocol and cannot adapt itself to the use of an extensible protocol in which additional functionalities may be incorporated.

A WSDL document does not enable a modular protocol to be described either, that is to say one that comprises optional functionalities, the use of which is left up to each client computer.

The result of this is that a protocol such as SOAP 1.2 simply cannot be described by a WSDL document, that protocol being at the same time modular and extensible.

The object of the present invention is to overcome the aforementioned drawbacks and to enable in particular the access to services provided on a communication network via extensible communication protocols.

To that end, the present invention in a first aspect relates to a method of proposing a service provided by a server computer in a communication network, comprising a step of sending a service description document comprising information relating to a communication protocol including a description of at least one functionality implemented by said communication protocol on the execution of the service on the communication network.

The present invention thus makes it possible within the same service description document to include information on a functionality implemented by the communication protocol, such that it is possible to specify in the same document what functionalities of a protocol are supported by the server computer.

This functionality being defined by a service description document sent to the client computer, it is possible, on receiving this document by the client computer, to determine whether it supports a particular other communication protocol proposed by the server computer to implement the service.

The invention thus makes it possible to facilitate the access by a client computer to a web service proposed by a server computer.

According to a preferred feature of the invention, the description of that functionality is included by reference in the service description document.

Thus, the same functionality described in a separate file may be incorporated by reference in several communication protocols using that same functionality.

This feature makes it possible to limit the size of the service description document in which several communication protocols may be proposed, by thus limiting the description of the functionalities implemented by each communication protocol.

In a practical manner, the description of the functionality comprises a list of properties supported by said functionality, so as to describe different options associated with that functionality.

Preferably, for at least one property supported by the functionality, the description of that functionality comprises a list of values attributable to that property.

According to another preferred feature, at least one property is furthermore associated with an attribute adapted to indicate whether understanding or use of that property by a client computer is mandatory or not on implementation of the communication protocol for the execution of the service on the communication network.

Thus in the service description document it is possible to indicate to the client computer whether each property of the functionalities implemented by the protocol must be understood and whether its use is optional or not, so as to facilitate the choice of a communication protocol by the client computer seeking to implement the service via the communication network.

According to a another preferred feature, the description of a functionality is associated with an attribute adapted to indicate whether understanding or use said functionality by a client computer is mandatory or not on implementation of the communication protocol for the execution of said service on the communication network.

As previously, the use of such an attribute makes it possible to indicate whether the understanding or use is optional or not of a functionality associated with a communication protocol for the execution of the service on the communication network.

According to a feature particularly well adapted to the service description document of WSDL type, the description of said functionality is included in the second part of such a document, including the information relating to at least one communication protocol implemented on execution of the service provided by the server computer.

According to a second aspect of the invention, a method of analyzing, by a client computer of a communication network, a service description document comprising information relating to a communication protocol including a description of at least one functionality implemented by said communication protocol on execution of a service, comprises, for each protocol known to the client computer of the communication network, the following steps:
    extracting the description of the functionalities implemented by the protocol;
    verifying that each functionality is supported by the client computer of the communication network; and
    adding this protocol to a list of protocols usable for the execution of the service supplied by the server computer if all the functionalities associated with this communication protocol are supported by the client computer.

Thus, the method of analyzing a service description document enables identification for a client computer of the communication protocols usable on the communication network and supported by the server computer which it is capable of using for the execution of the service.

In a complementary manner, the present invention also relates to a device for proposing a service provided by a server computer in a communication network. This device comprises means for sending a service description document comprising information relating to a communication protocol including a description of at least one functionality implemented by the communication protocol on the execution of the service on the communication network.

It also relates to a device for analyzing, by a client computer of a communication network, a service description document comprising information relating to a communication protocol including a description of at least one functionality implemented by the communication protocol on the execution of said service.

This analyzing device comprises:
    means for extracting the description of the functionalities implemented by a protocol;
    verification means adapted to verify if each functionality is supported by the client computer of the communication network; and
    means for adding said protocol to a list of protocols usable for the execution of the service supplied by the server computer if all the functionalities associated with the communication protocol are supported by the client computer.

This device for proposing a service and this analyzing device have features and advantages that are similar to those of the methods which implement them.

Furthermore, the present invention relates in a third aspect to a method of proposing a service provided by a server computer, in a communication network implementing at least one communication protocol, comprising a step of sending a service description document comprising information relating to mandatory values associated with at least one functionality implemented by said communication protocol on the execution of said service on the communication network.

Thus, within the same service description document, the present invention makes it possible to completely describe an extensible communication protocol by specifying what functionalities must be used and with what mandatory values. The functionalities to use and their mode of use are thus imposed by the server and indicated to a client computer.

This description defined actually within a service description document sent to a client computer, makes possible the use of extensions of a protocol such as SOAP 1.2.

Specialization of the protocol may thus be made for a particular function and for a particular client of the communication network.

According to a preferred feature of the invention, said functionality supports at least one property and the service description document comprises information relating to at least one mandatory value associated respectively with each property of said functionality.

The service description document thus makes it possible to define the mandatory values taken by a property of a functionality, either by a unique value, or by a restriction of the choice of the potential values taken by that property.

According to another preferred feature, said functionality is furthermore associated with an attribute adapted to indicate whether use of that functionality by a client computer is mandatory or not on the implementation of the communication protocol for the execution of the service on the communication network.

The use of such an attribute makes it possible to indicate whether the use is optional or not of a functionality associated with a communication protocol for the execution of the service on the communication network.

When a client uses an optional functionality, he must follow the rules of use described in the document via the values of the properties, as in the case of a mandatory functionality.

In a practical embodiment of the present invention, the service description document is written in a markup language, the information relating to mandatory values being included in a tag referencing a functionality of the communication protocol.

When the service description document is a document of WSDL type, comprising a first part including information relating to the messages exchanged on the execution of the service and a second part including information relating to at least one communication protocol implemented on the execution of the service, the information relating to mandatory values is preferably included in the second part of the service description document.

According to a fourth aspect of the invention, a method of testing access to a service by a client computer of a communication network, on the basis of a service description document comprising information relating to a communication protocol comprises the following steps:

- extracting information relating to at least one functionality implemented by said protocol;
- acquiring at least one mandatory value associated with said functionality on the execution of the service on the communication network; and
- verifying whether the mandatory value associated with said functionality is supported by the client computer of the communication network.

Thus the method of testing access to a service enables a client computer to directly verify, on the basis of a service description document, whether it supports the different functionalities implemented by a communication protocol.

Preferably, the method of testing access comprises, prior to the acquiring step, a testing step adapted to verify whether the functionality is implemented by the client computer and whether the use of the functionality is mandatory or not on the implementation of the communication protocol for the execution of the service on the communication network.

According to a fifth aspect of the invention, a method of verifying compatibility of a communication protocol on the basis of a service description document comprising information relating to a communication protocol, comprises the following steps:

- extracting from the service description document a functionality implemented by said communication protocol on the execution of the service on the communication network;
- acquiring at least one mandatory value associated with said functionality in the service description document;
- acquiring a description of said functionality; and
- verifying whether said mandatory value is included in a list of values attributable to a property supported by said functionality.

When a communication protocol and its optional functionalities are described for example in an XML representation, it is possible to verify on the basis of the service description document whether the protocol with the particular values associated with each functionality conforms to the general description of the protocol.

In a complementary manner, the present invention relates in its third aspect to a device for proposing a service provided by a server computer in a communication network implementing at least one communication protocol.

This device comprises means for sending a service description document comprising information relating to mandatory values associated with at least one functionality implemented by the communication protocol on the execution of the service on the communication network.

It also relates to a device for testing access to a service by a client computer of a communication network, on the basis of a service description document comprising information relating to a communication protocol.

This access testing device comprises means for extracting information relating to at least one functionality implemented by the protocol, means for acquiring at least one mandatory value associated with that functionality on the execution of the service on the communication network, and verifying means adapted to verify whether the mandatory value associated with the functionality is supported by the client computer of the communication network.

Finally, the invention relates to a device for verifying compatibility of a communication protocol on the basis of a service description document comprising information relating to a communication protocol.

This device for verifying compatibility comprises means for extracting from the service description document a functionality implemented by the communication protocol on the execution of the service on the communication network, means for acquiring at least one mandatory value associated with the functionality in the service description document, means for describing the functionality, and verifying means adapted to verify whether the mandatory value is included in a list of values attributable to a property supported by the functionality.

These devices for proposing a service, for testing access to a service and for verifying compatibility of a protocol have features and advantages that are similar to those of the methods that they implement.

Furthermore, the present invention relates to a computer program readable by a microprocessor comprising portions of software code adapted to implement the method of proposing a service according to the first or third aspect of the invention, and/or the analyzing method, and/or the method of testing access to a service and/or the method of verifying compatibility of a protocol according to the invention, when that computer program is loaded and executed by the microprocessor.

The computer program has similar features and advantages to the methods which it implements.

Further particularities and advantages of the invention will appear from the following description.

In the accompanying drawings, given by way of non-limiting example:

FIG. 4a illustrates a list of protocols usable for the execution of a service updated by the analyzing method according to the invention;

FIG. 4b is an example of functionalities associated with a protocol;

FIG. 4c illustrates an example of properties supported by a functionality;

Figure 1:
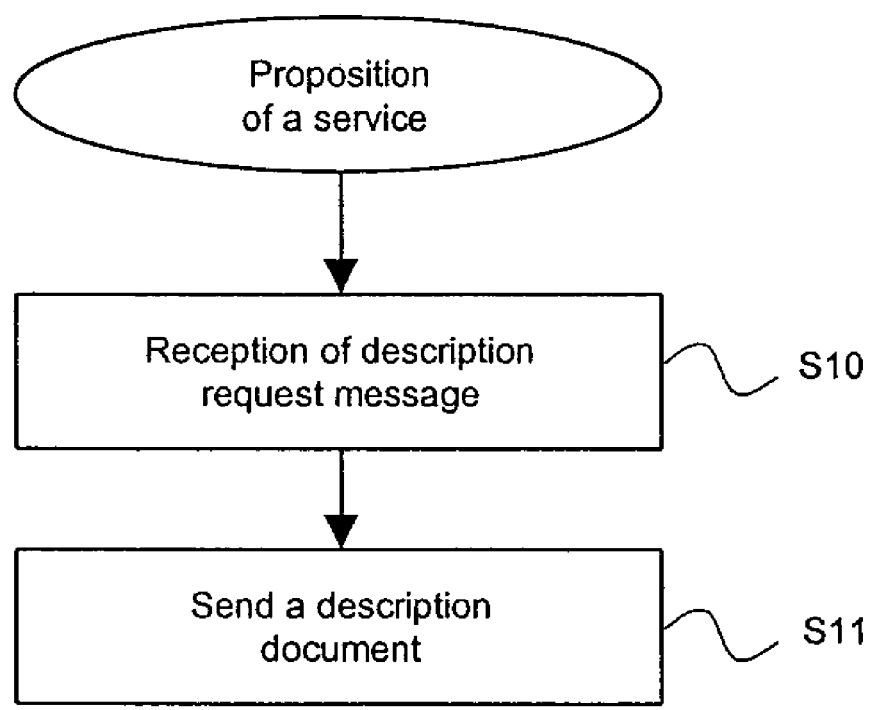
FIG. 1 is an algorithm illustrating a method of proposing a service according to the invention.

With reference to FIG. 1 there will first of all be described a method of proposing a service provided by a server computer in a communication network.

In a computer network such as the Internet, servers provide data in the form of documents to client computers.

Very often, these server computers also provide services, called Web services, enabling a client computer to send data to the server which processes them and sends back a result.

In particular, when a client computer of a communication network wishes to use the services provided by a server computer, it sends a message in order to require a description of the services provided by that server computer.

On reception S10 of such a description request, the method of proposing services comprises a step S11 of sending a service description document.

In what follows, and in non-limiting manner, it will be considered that the service description document uses the WSDL language (WSDL being an acronym of "Web Service Description Language"), which is a language enabling Web services to be described.

This WSDL language is an improved XML language, making it possible to describe a Web service using XML tags.

A WSDL document contains principally two parts. A first part, called the abstract part, describes in an abstract manner the messages which are exchanged between computers of the communication network on implementation of a service. A second part is adapted to comprises concrete information, defining the transmission of the messages over the communication network.

The first part is itself divided into three sub-parts.

The first sub-part of this first part contains declarations of types, enabling the abstract structure of the messages to be described. These types are next referenced in the second sub-part of the first part of the WSDL document.

The declaration of these types is generally achieved by means of tags <types> . . . </types>.

This declaration of types is well-known in documents written in XML language and it is not necessary for the understanding of the invention to describe the types used in more detail.

The second sub-part of the first part of the document contains declarations of elementary messages.

It thus defines the messages which will be exchanged between the computers on implementation of the service, without precisely describing the content or sequence.

It consists of defining a transmitted data (input or output) in an abstract manner and giving its type.

By way of example, and solely to facilitate the understanding of the present invention, the following messages may be defined, without there being a link between them:

a) a first message makes it possible to transmit the name of an action:

```
<message name="GetStockQuoteInput">
    <part name="Name" type="string"/>
</message>
``` b) a second message makes it possible to transmit the price associated with an action:

```
<message name="GetStockQuoteOutput">
    <part name="Price" type="float"/>
</message>
```

A third sub-part of the first part of a WSDL document makes it possible to group together the elementary messages thus defined in the two first sub-parts in logic operations.

An operation may be considered as an elementary service, the latter itself being implanted by one or more messages.

It is thus defined by its inputs and outputs, that is to say by the messages which it exchanges.

For example, an operation returning the value of an action on reception of the name of that action may be defined as follows:

```
<operation name="GetStockQuote">
    <input message="tns:GetStockQuoteInput"/>
    <output message="tns:GetStockQuoteOutput"/>
</operation>
```

Clearly more sophisticated forms of operation, constituted by a complex set of exchanges of messages, could by described in this language.

This first part of the WSDL document thus makes it possible to define the type, content and order of the messages exchanged between computers of the network on the implementation of a service proposed by a server computer.

The WSDL document further comprises, as explained previously, a second part which makes it possible to specify which protocol is actually used to transmit the messages and what form of encoding or representation format is used to represent these data in a form adapted to the communication network.

This second part thus corresponds to a binding consisting of specifying a concrete protocol and a data format for an operation defined in the first part of the WSDL document.

In accordance with the invention, the information relating to a communication protocol included in that second part of the WSDL document, comprises the description of at least one functionality implemented by the communication protocol on execution of the service proposed on the communication network.

In particular, the information relating to a communication protocol included in that second part of the WSDL document comprises also mandatory values associated with at least one functionality implemented by the communication protocol on the execution of the service proposed on the communication network.

The present invention thus makes it possible to define a protocol used by a service, the functionalities of that protocol and the mandatory values taken by the functionalities.

Such a service description document may thus apply to any protocol, and for example to the known protocol HTTP ("HyperText Transfer Protocol") or again to SMTP ("Simple Mail Transfer Protocol") or else via a communication protocol such as SOAP 1.2.

This functionality description generally consists in defining a functionality by a list of properties supported by that functionality.

It is thus a matter of giving a description, for example in a markup language of the XML type, of the functionalities in order to identify each functionality and to describe the properties associated with that functionality. Once these elements or functionalities are defined, they may be used to be included in a description of a communication protocol via a WSDL document.

A service description document is thus obtained written in an improved WSDL language.

Examples will be given below of description in XML language of functionalities.

A functionality may be identified by a URI ("Unique Resource Identifier"), and defined by a list of properties.

The functionality may also be identified by a local reference specific to the server computer hosting the WSDL document.

The XML description of a functionality is encapsulated in an XML element. The name of this element is different according to the nature of the functionality.

Distinction is made between several types of functionality, among which are the "features" elements which represent a feature, the element "mep" which represents an MEP ("Message Exchange Pattern"); the element "module" which represents a module and the element "field" which represents a protocol field thus enabling a protocol header to be defined.

A module corresponds to the implementation of one or more features.

This element comprises a mandatory attribute "name" making it possible to reference the description of the functionality later on and a second mandatory attribute "id", uniquely identifying the functionality. The identification of the functionality may be carried out for example via a URI.

Furthermore, the list of the properties supported by that functionality is inserted within the element. Each property is defined by an element which we will call "property". This element has a mandatory attribute "name". For each property, the description of the functionality comprises a list of values attributable to that property.

Thus, by way of example, the functionality "Web Method" defined by the SOAP standard may be described as follows:

```
<feature name="web-method"
    id="http://www.w3.org/2002/06/soap/features/web-method"
    xmlns:webmeth="http://www.w3.org/2002/06/soap/features/web-
    method">
        <property name="webmeth:Method">
            <values>
                <value>GET</value>
                <value>POST</value>
                <value>PUT</value>
                <value>DELETE</value>
            </values>
        </property>
</feature>
```

Thus, in this example, the functionality "Web Method" has a property named "Method" of which the value may be the values GET, POST, PUT and DELETE.

The description of this functionality thus comprises the list of the properties supported by the functionality.

This makes it possible to describe functionalities having options proposed in the form of properties.

By default, if the description of a functionality does not comprise a list of properties supported, all the mandatory properties of the functionality are supported, but no optional property is supported.

In the preceding example, the property "Method" is supported by the functionality "Web Method".

The description of each functionality comprises, for each property supported, the list of values accepted for that property.

By default, if the list of values accepted for a property is not specified, all the non-optional values are accepted, whereas no optional value is accepted.

As is well-known in XML language, the description of the property "Method" may also be carried out by virtue of a schema language such as XML-Schema, such that the description of that property is inserted by reference in the description of the functionality.

The preceding example would then be described in the following manner:

```
<feature name="web-method"
    id="http://www.w3.org/2002/06/soap/features/web-method">
        <property name="Webmeth Method" type="MethodType"/>
</feature>
<simpleType name="MethodType" finale="extension">
    <restriction base="xsd:string">
        <enumeration value="GET" />
        <enumeration value="POST" />
        <enumeration value="PUT" />
        <enumeration value="DELETE" />
    </restriction>
</simpleType>
```

In this embodiment, instead of specifying the value of the property, a type is associated with the element "property", this type being defined by a schema language such as XML-Schema.

Furthermore, to the description of a functionality it is possible to add a specific attribute, denoted "mustUnderstand", adapted to indicate whether the understanding of the property in question is mandatory or not by a client computer on implementation of the communication protocol for the execution of the service proposed.

When this attribute "mustUnderstand" is associated with a value "true", this means that it is mandatory for the client computer to understand the associated property in order to access a service using the described functionality. Furthermore is mandatory for it to use that property when that property applies.

The functionality "Web Method" may thus be defined as follows:

```
<feature name="web-method"
    id="http://www.w3.org/2002/06/soap/features/web-method"
    xmlns:webmeth="http://www.w3.org/2002/06/soap/features/web-
    method">
        <property name="webmeth:Method" mustUnderstand="true">
            <values>
```

```
        <value>GET</value>
        <value>POST</value>
        <value>PUT</value>
        <value>DELETE</value>
      </values>
   </property>
</feature>
```

Similarly, it is possible to add to the description of a property of a functionality a specific attribute, denoted "mustUse", adapted to indicate whether the use of the property in question is mandatory or not by a client computer on implementation of the communication protocol for the execution of the service proposed.

When this attribute "mustUse" is associated with a value "true", this means that it is mandatory for the client computer to use the associated property in order to access a service using the described functionality.

The functionality "Web Method" may thus be defined as follows:

```
<feature name="web-method"
    id="http://www.w3.org/2002/06/soap/features/web-method"
    xmlns:webmeth="http://www.w3.org/2002/06/soap/features/web-method">
   <property name="webmeth:Method" mustUse="true">
      <values>
        <value>GET</value>
        <value>POST</value>
        <value>PUT</value>
        <value>DELETE</value>
      </values>
   </property>
</feature>
```

Finally, a functionality "feature" may be a concrete expression of another abstract functionality "feature". In this case, a relationship between two functionalities may be described using an element "implements" inserted in the description of the concrete functionality.

In the example below, an abstract functionality is defined for attachment of documents and of carrying out that protocol using the MIME Multipart/related standard:

```
<feature name="attachment"
   id="http://www.crf.canon.fr/2002/05/soap/features/attachment">
      ...
</feature>
<feature name="mime-attachment"
   id="http://www.crf.canon.fr/2002/05/soap/features/attachment/mime">
      <implements name="attachment"/>
      ...
</feature>
```

Different types of functionality may thus be described in the same manner.

Moreover, by way of example, a message correlation functionality may be described in the following manner:

```
<feature name="email-correlation"
id="http://www.example.org/2001/12/soap/bindings/Email/correlation"
xmlns:correlation="http://www.example.org/2001/12/soap/bindings/Email/correlation">
   <property name="correlation:requestMessageID"/>
</feature>
```

Or again a message transfer mode functionality (binary or text):

```
<feature name="binary"
    id="http://www.crf.canon.fr/2002/05/soap/bindings/FTP/binary"
    xmlns:binary="http://www.crf.canon.fr/2002/05/soap/bindings/FTP/binary">
   <property name="binary:TransferMode">
      <values>
        <value>binary</value>
        <value>text</value>
      </values>
   </property>
</feature>
```

Or again, a compression functionality:

```
<feature name="compression"
id="http://www.crf.canon.fr/2002/05/soap/bindings/HTTP/compression"
xmlns:compression="http://www.crf.canon.fr/2002/05/soap/bindings/HTTP/compression">
   <property name="compression:CompressionAlgorithm">
      <values>
        <value>gzip</value>
        <value>tar</value>
      </values>
   </property>
</feature>
```

In the latter example, this compression functionality only supports the algorithms GZIP and TAR, and for example does not support other algorithms of ZIP, BZIP or SIT type.

Although examples of functionalities using SOAP protocol have been described above, any type of functionality, applying to other protocols, may be described in the same manner. These functionalities may correspond to optional functionalities of a protocol or to extensions of that protocol. Thus, by way of example, a functionality for insertion of a return electronic address for an email protocol may be written in the following manner.

```
<feature name="return-path"
    id="http://www.crf.canon.fr/2002/05/smtp/return-path"
    xmlns:return-path="http://www.crf.canon.fr/2002/05/smtp/return-path">
   <property name="return-path:Address">
   </property>
</feature>
```

Functionalities of special type also exist, such as an MEP ("Message Exchange Pattern").

This MEP element is used to define a model for message exchange between a plurality of nodes of a communication network.

For example, this MEP model may be of request-response type such that a first computer sends a message to a second computer which sends it back a response message.

Such an MEP element may be described in the following manner:

```
<mep name="request-response"
    id="http://www.w3.org/2002/06/soap/mep/request-
response"
xmlns:context="http://www.w3.org/2002/06/soap/bindingFramework/
ExchangeContext/"
xmlns:reqres="http://www.w3.org/2002/06/soap/mep/request-
response">
    <property name="reqres:Role"/>
    <property name="reqres:State"/>
    <property name="reqres:OutboundMessage"/>
    <property name="reqres:InboundMessage"/>
    <property name="reqres:ImmediateDestination"/>
    <property name="reqres:ImmediateSender"/>
    <property name="context:ExchangePatternName"/>
    <property name="context:FailureReason"/>
</mep>
```

It is also possible to use this same mechanism of description to describe a module, for example an authentication module:

```
<module name="basic-auth" id="http://www.crf.canon.fr
/modules/basic-auth">
    <property name="bauth:Username" type="xsd:string"/>
    <property name="bauth:Password" type="xsd:string"/>
</module>
```

These different elements described beforehand then enable a communication protocol to be described. Generally, the description of a protocol is carried out using a "protocol" element. An "name" attribute gives a name to the protocol, this name making it possible to reference the protocol in the description of a Web service, that is to say in a WSDL document.

An attribute "id" enables this protocol to be identified uniquely using a URI electronic address.

In accordance with the invention, the description of the protocol includes at least the description of a functionality supported by this protocol. Thus the SOAP protocol associated with the HTTP transport protocol via a binding may be described in the following manner:

```
<protocol name="w3c-soap12-http11"
    id="http://www.w3.org/2002/06/soap/bindings/HTTP">
    <mep name="request-response"/>
    <mep name="soap-response"/>
    <feature name="web-method"/>
</protocol>
```

Such a description indicates that the SOAP protocol associated with the transport protocol HTTP supports the MEP functionalities of request-response and SOAP response type, as well as the Web Method functionality.

In this preferred embodiment, the description of each functionality is included by reference within the "protocol" element.

Each "mep" or "feature" or again "module" element included in a protocol element may furthermore be associated with an attribute of mustUnderstand type adapted to indicate that the understanding of that functionality must be mandatory on implementation of the communication protocol by the client computer for the execution of a service on the communication network.

In practice, as already described, this "mustUnderstand" attribute is associated with a value "true" which indicates that the client computer must support that "mep" or "feature" functionality and that it is mandatory for it to use it when that functionality applies.

As previously, an attribute "mustUse" may also be used to indicate that the use of the functionality is mandatory or not.

In the particular case of the "mep" functionality, thus "mustUse" attribute is useful since it obliges a client computer to use an mep element as much as possible which cannot apply to all operations (for example, an mep of simple request, without response, which cannot be used to access a service sending back a response).

Other examples of use of the SOAP protocol are given below, for example with another HTTP binding, or with an electronic mail binding, or even by direct use of the HTTP communication protocol.

```
<protocol name="crf-soap12-http11"
    id="http://www.crf.canon.fr/2002/05/soap/bindings/HTTP">
    <mep name="request-response"/>
    <feature name="email-correlation"/>
    <feature name="compression"/>
    <feature name="web-method"/>
</protocol>
<protocol name="w3c-soap12-email"
    id="http://www.example.org/2002/02/soap/bindings/Email">
    <mep name="request-response"/>
    <feature name="email-correlation"/>
</protocol>
<protocol nbame="ietf-http11"
    id="http://www.crf.canon.fr/2002/05/ieft/bindings/HTTP">
    <mep name="request-response"/>
    <feature name="web-method"/>
</protocol>
```

The "protocol" elements so defined may thus be included in a service description document, and more particularly in the concrete part of that document comprising information relating to a communication protocol.

When the service description document uses a markup language such as XML, for example in a WSDL document, the different functionalities are respectively described in child tags included in a tag referencing a communication protocol.

A communication protocol may thus be extended by defining a plurality of functionalities, optional to that protocol, directly in a service description document of WSDL type.

As already described, the functionalities may be defined independently, with a list of properties and values supported by these properties, and these functionalities may in particular be chosen from functionalities defined by the SOAP protocol for information exchange.

In a WSDL document, the binding element "binding" previously described may thus be written in accordance with the invention:

```
<binding name="StockQuoteBinding"
    type="tns:StockQuotePortType">
    <protocol name="w3c-soap12-http11"/>
    <operation name="GetStockQuote">
        <input>
            <soap:body use="literal"/>
        </input>
        <output>
            <soap:body use="literal"/>
        </output>
```

-continued

```
        </operation>
    </binding>
```

In the above example, it is considered that the "protocol" element describing the communication protocol and the WSDL description document, describing a Web service using that protocol, are to be found in the same file. If that is not the case, the file containing the description of the "protocol" element may be referenced from the file containing the description of the WSDL service using an "import" element.

In order to further improve the description of a protocol, and in particular whether or not use of different functionalities is optional or not, other types of tags may be defined.

In particular, a "choice" element may be used to indicate that a functionality must not be used with another particular functionality.

Similarly, a "group" element may on the contrary be used to indicate that a functionality must be used with another particular functionality.

The writing of a "protocol" element may then appear as follows:

```
    <group name="MyMep">
        <feature name="Web-Method"/>
        <choice>
            <mep name="request-response"/>
            <mep name="soap-response"/>
        </choice>
    </group>
    <protocol name="CRF">
        <choice>
            <mep name="request-Nresponses"/>
            <mep name="request-Noresponse"/>
            <group name="MyMep"/>
        </choice>
    </protocol>
```

A CRF protocol may thus be defined, which leaves the choice between three exclusive possibilities, identified by virtue of the "choice" element. The first two possibilities are MEP elements. The last possibility "MYMEP" corresponds to the sum of two functionalities, with the use of the "group" element.

use of the functionality MEP Method;
use of the element MEP request-response or SOAP response.

Another example of the use of these elements "choice" and "group" is illustrated below.

```
    <protocol name="CRF">
        <group>
            <choice name="MEP">
                <mep name="request-response"/>
                <mep name="soap-response"/>
            </choice>
            <choice name="Authentication">
                <feature name="basicAuth"/>
                <feature name="ss1Auth"/>
                <feature name="xmlSigAuth"/>
            </choice>
        </group>
    </protocol>
```

In this latest example, the description of the protocol indicates to a client that he must choose an MEP element from two possibilities and an authentication mechanism from three possibilities.

Similarly, the definition of a protocol could be completed by using an element "set" which would allow a client to choose a certain number of functionalities from among the child tags of that element "set".

The number of functionalities to choose could be fixed using a "number" attribute of the "set" element.

In this connection it may be noted that the "choice" element defined above is equivalent to the element <set number="1"> and that the "group" element is equivalent to the element <set number="all">.

A "number" attribute associated with the value "unlimited" would make it possible to specify to a client computer the possibility of using as many functionalities as it wishes among the functionalities proposed in the communication protocol.

The invention thus makes it possible to describe which protocols are supported by a server proposing Web services.

It makes it possible to describe which functionalities of these protocols are supported by the server and to specify if these functionalities must be understood or used by the client computer.

It makes it possible to describe which properties of a functionality are supported by the server, to indicate the possible values for the properties and to specify if these properties must be understood or used by the client computer.

All these capabilities make it possible to facilitate the access by a client computer to a Web service proposed by a server.

The description of a protocol being independent from the binding elements "binding", it does not have to be replicated in each element "binding". This makes it possible to reduce the size of the file describing the Web services and to accelerate it's processing time by the client computer.

Furthermore, the description of the protocol may be shared by several servers or by several Web services of the same server. This also makes it possible to reduce the volume of the information transmitted over the network and to accelerate the processing time of that information by a client computer.

The description model of the invention is common to all the protocols. This makes it possible to simplify the adding of a protocol to a server or to a client computer. It also makes it possible to simplify the implementation of the client part decoding the description of a Web service.

Thus, a description document of a WSDL service may, in order to describe a communication protocol, use a description making it possible to identify each functionality associated with the protocol and to describe the properties of those functionalities. In particular, it is possible to define a functionality via a list of properties, that is to say to define the properties which exist and the values which may be taken by those properties.

Such a functionality description is used in a description document of a WSDL service by including information relating to mandatory values associated with the functionalities implemented by the communication protocol for the extension of the service on the communication network.

In practice, for each functionality used by the communication protocol, the service description document specifies how the functionality is used, that is to say what mandatory values will be respectively taken by each property associated with the functionality.

In practice, the description in XML language of the functionalities makes it possible to declare those functionalities in a description document of a service of type WSDL.

The information relating to the mandatory values taken by the functionality are included in the second part of the service description document, that is to say in the concrete part of the description document of a WSDL service.

In a service description document of a service written in markup language of WSDL type, the information relating to the mandatory values are included in a tag referencing a functionality of the communication protocol.

More particularly, a declaration is made and a description is given of the use of the functions within each "operation" element which may contain one or more messages exchanged on the execution of the service.

In order to facilitate the understanding of the invention, and in a manner that is in no way limiting, two examples are given below of a concrete part of a description document of a WSDL service in which are included the information relating to mandatory values associated with functionalities implemented by the protocol.

In the first example, the information is included in a "protocol binding" and only comprises information relating to the communication protocol, to the exclusion of any other information on the format of representation of the messages.

```
<protocolBinding name="stockMgtSoapHttp" binding="stockMgtSoap">
    <protocol name="w3c-soap12-http11"/>
    <operation name="getQuantityInStock">
        <feature name="web-method">
            <property name="Method">
                GET
            </property>
        </feature>
        <mep name="request-response"/>
        <module name="basic-auth"/>
    </operation>
</protocolBinding>
```

This particular element "protocol binding" does not require to be described in more detail here for the understanding of the present invention.

In the second example, the information relating to mandatory values are included directly in the "binding" element in accordance with the protocol for description of a service made to conform to WSDL 1.1.

```
<binding name="stockMgtSoapBinding" type="stockMgt">
    <soap:binding transport="..." style="document"/>
    <operation name="getQuantityInStock">
        <feature name="web-method">
            <property name="Method">
                <restriction base="MethodType">
                    <enumeration value="GET"/>
                    <enumeration value="POST"/>
                </restriction>
            </property>
        </feature>
        <mep name="request-response"/>
        <module name="basic-auth"/>
    </operation>
</protocolBinding>
```

Each functionality is chosen among types of functionality (MEP, feature, module or protocol field) defined by a protocol for information exchange.

To declare that a functionality must be understood and used, there is added to the description an element of the feature, MEP or module type which contains a reference to a description in XML language of the functionality.

Preferably, this reference corresponds to an attribute "Name" of the element which thus makes it possible to define the functionality uniquely.

As the preceding examples show well, the information relating to mandatory values is included in an "operation" tag referencing an operation comprising one or more messages exchanged on the execution of the service.

Here, the information is thus included in the tag referencing the operation "GetQuantityInStock".

In accordance with the invention, within each element, and for example within the "feature" element, the value of the properties associated with the functionality is specified.

Thus, in the first example, the "method" property may take the values GET, POST, PUT and DELETE.

In the first embodiment, a mandatory value, here equal to GET, is associated with the "method" property of the functionality "web-method".

Alternatively, it is also possible not to indicate a unique mandatory value associated with a property, but also a plurality of mandatory values, i.e. in other words, to restrict the choice of the values which a property may support.

In the second example, the value of the "method" property has been restricted to the values GET and POST.

In this second example, the client computer may then choose an exact value of the "method" property in the sub-set of values specified in the WSDL description.

Thus, by virtue of the invention, it is possible to define exactly the extensions which a client computer must use to access a service.

A client computer of a communication network may thus, on the basis of the analysis of a service description document, easily test whether or not an access is possible to a service provided by a server computer of the communication network.

A method of analyzing a service description document by a client computer of a communication network will thus be described.

As already described, this service description document comprises information relating to a communication protocol, that information including a description of at least one functionality implemented by the communication protocol on execution of the service.

Figure 2:
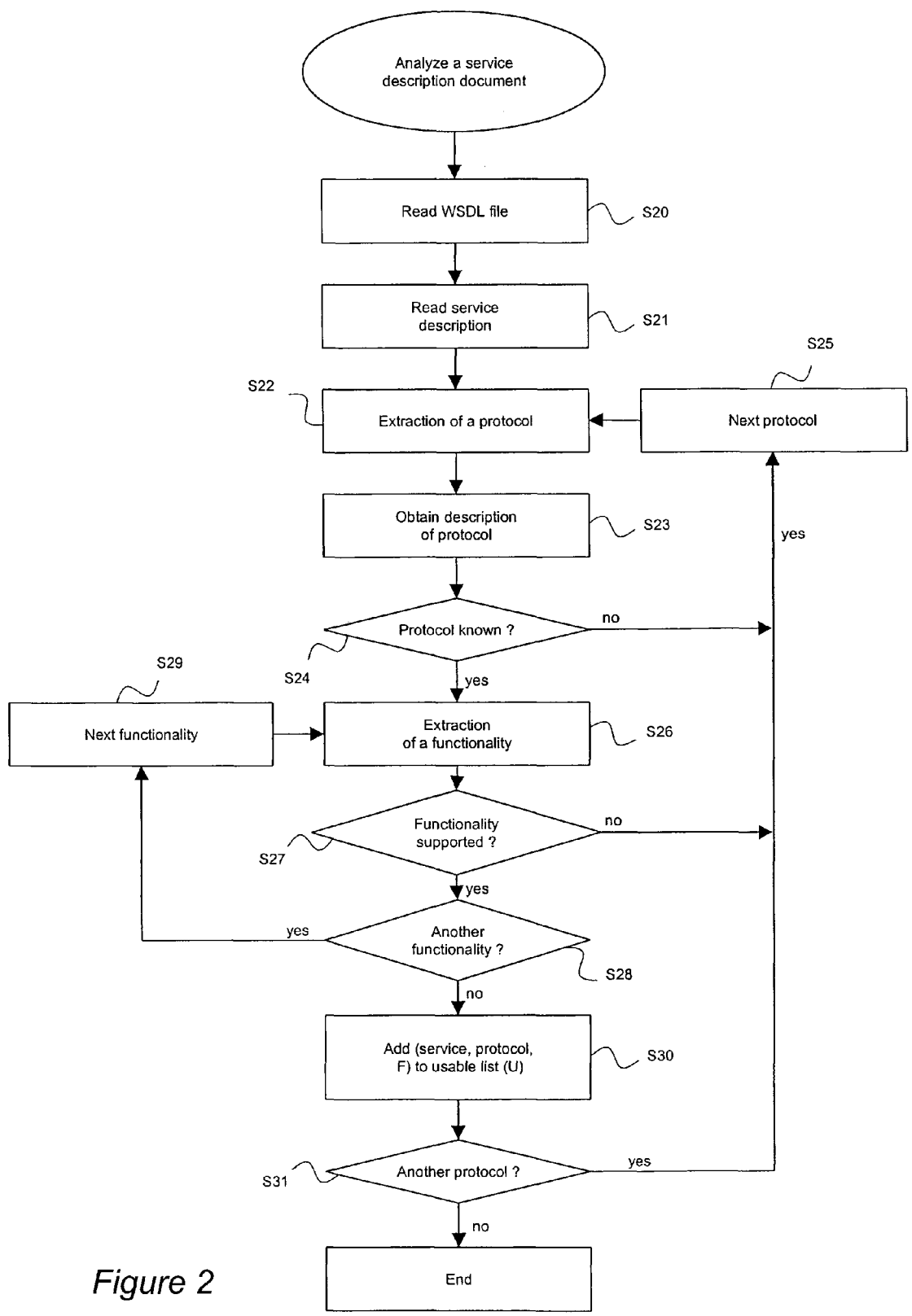
FIG. 2 is an algorithm illustrating the method of analyzing a service description document according to the second aspect of the invention.

As described in FIG. 2, that analysis method comprises first of all a step S20 of reading a WSDL file.

In that embodiment, the service description document is represented in a markup language of WSDL type, completed and improved by the description of one or more functionalities as described previously.

A reading step S21 is adapted to specifically read the description of a service as described in a WSDL description document.

An extraction step S22 is next implemented in order to extract a first communication protocol.

In an obtaining step S23, the description of the communication protocol is obtained by identification of the information relating to that communication protocol and included in the WSDL document.

At a test step S24, the client computer implementing the analyzing method according to the invention verifies whether the communication protocol so described is known.

If not, a next protocol may possibly be considered at a reading step S25.

Thus, as illustrated in FIG. 4a, for the same service identified at the reading step S21, for example the service "StockQuoteService", there are therefore three communication protocols usable for the implementation of that service, identified by the following names:

w3c-soap12-http11,
crf-soap12-http11,
ieff-http11.

When a known protocol is identified at the test step S24, a functionality, described in the WSDL description document and associated with that protocol, is extracted in an extraction step S26.

Thus, as illustrated in FIG. 4b, by way of example, for the communication protocol w3c-soap12-http11, there are three functionalities entitled request-response, soap-response, and web-method.

A test step S27 is next implemented to verify whether the functionality so extracted is supported by the client computer.

Figure 3:
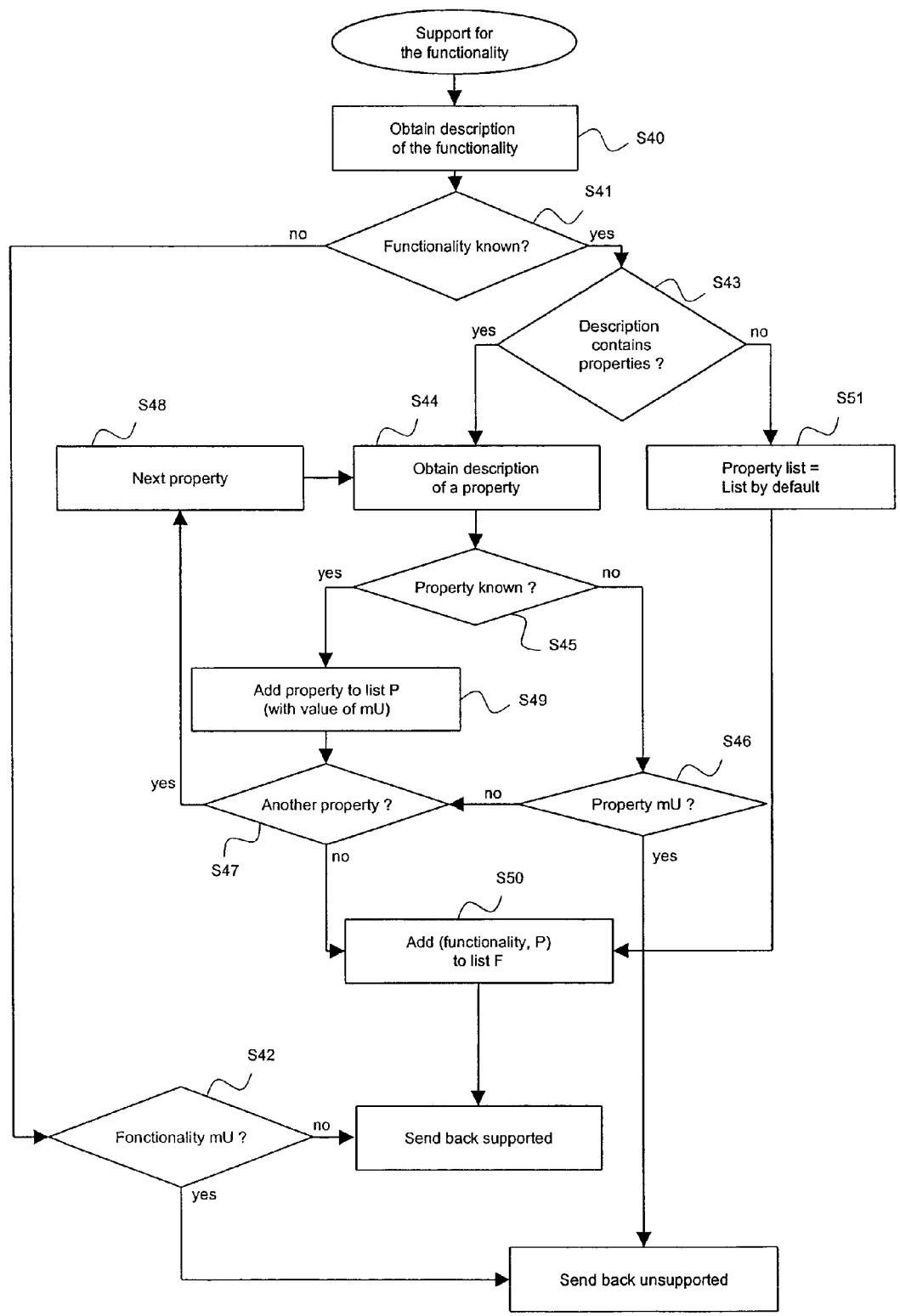
FIG. 3 is an algorithm detailing the step of testing the support by a client computer of the functionality.

This test step is detailed in FIG. 3.

It comprises first of all a step S40 of obtaining the description of the functionality analyzed.

In a test step S41, it is verified whether that functionality is known to the client computer.

If not, a test step S42 is adapted to verify whether that functionality is associated with an attribute mU, that is to say with an attribute "mustUnderstand" or "mustUse" as previously described.

If such an attribute has a value "true", the response sent back at test step S27 is negative such that the functionality is not supported by the client computer.

Thus, as illustrated at FIG. 4b, the functionality web-method may be associated with an attribute mU of which the value is "true".

On the other hand, if the functionality, even though not known by the client computer, is not associated with an attribute mU, the response sent back for that functionality indicates that it is supported by the client computer since its implementation on execution of a service is not necessary.

If, at the issue of test step S41, the functionality is known to the client computer, a test step S43 makes it possible to determine whether the description of the WSDL document contains properties associated with that functionality.

If it does, an obtaining step S44 is adapted to obtain the description of a first property associated with the functionality.

As illustrated in FIG. 4c, for each functionality, a list of properties may be associated. By way of example, for the functionality "request-response", the following properties are described:

reqres:Role,
reqres:State,
reqres:OutboundMessage,
reqres:InboundMessage,
reqres:ImmediateDestination,
reqres:ImmediateSender,
context: ExchangePattern Name,
context:FailureReason.

In a test step S45, it is verified whether that property is known to the client computer.

If it is not, a second test step S46 is adapted to determine whether that property is associated with an attribute mU of which the value is true.

If it is known, the response sent back at the test step S27 is negative, since that property is not supported by the client computer.

Otherwise, it is verified in a test step S47 whether there is another property associated with the functionality analyzed.

If there is, the next property is considered at a step S48 and for that property the group obtaining steps S44 and subsequent are reiterated.

If, at the issue of the test step S45, the property analyzed is known to the client computer, an adding step S49 is adapted to add the property thus determined to a list of properties P, in association with the value "true" or "false" of the attributes mU.

The test step S47 is implemented in order to identify other possible properties associated with the functionality and the group of steps S44 to S49 is reiterated for that other property.

When all the properties have been analyzed, an adding step S50 is adapted to add the name of the functionality associated with the list of properties P in a functionality list F.

At the adding step S50 a functionality is thus identified which is supported by the client computer and associated with one or more properties, also supported by the client computer, enabling the implementation of the service.

If at the issue of the test step S43, the description analyzed does not contain any properties associated with the known functionality, an obtaining step S51 is adapted to obtain a list of properties corresponding to a default list of properties associated with that functionality.

This list by default may be drawn up in a standardized manner for each functionality, since new functionalities have not been introduced in the service description document by the server computer.

This list of properties, corresponding in fact to a list of properties implemented by default in the functionality known to the client computer, is added to the list F in an adding step S50.

Returning to FIG. 2, the response to the test S27 is then affirmative, since the functionality is supported by the client computer.

If at the issue of the test step S27, the functionality is not supported, the protocol cannot be implemented by the client computer and a next protocol is possibly identified in the reading step S25.

On the other hand, if at the issue of step S27, the functionality is supported by the client computer, it is verified in another test step S28 whether another functionality exists that is associated with the known protocol.

If there is, the next functionality is considered in an identification step S29, and the steps of extraction S26 and test S27 are reiterated for that new functionality.

When all the functionalities associated with the protocol have been analyzed and declared supported by the client computer as previously described, an adding step S30 is adapted to add the protocol to a list U of protocols usable for the execution of the service provided by the server computer.

In practice, that list U comprises for each service, the identification of a protocol associated with the functionality list F as constructed by the implementation of the algorithm described in FIG. 3.

In a test step S31, it is verified if there is another available protocol and described in the service description document for its implementation.

If there is, the next protocol is considered in a reading step S25 and for that protocol the group of steps S22 to S31 already described is reiterated.

When all the protocols have been analyzed in this manner, the method of analyzing the document terminates.

Thus at the issue of that analyzing method a list of usable protocols U is obtained, the client computer being able to use one or other of these protocols to access the services proposed by a server computer of the communication network.

Figure 5:
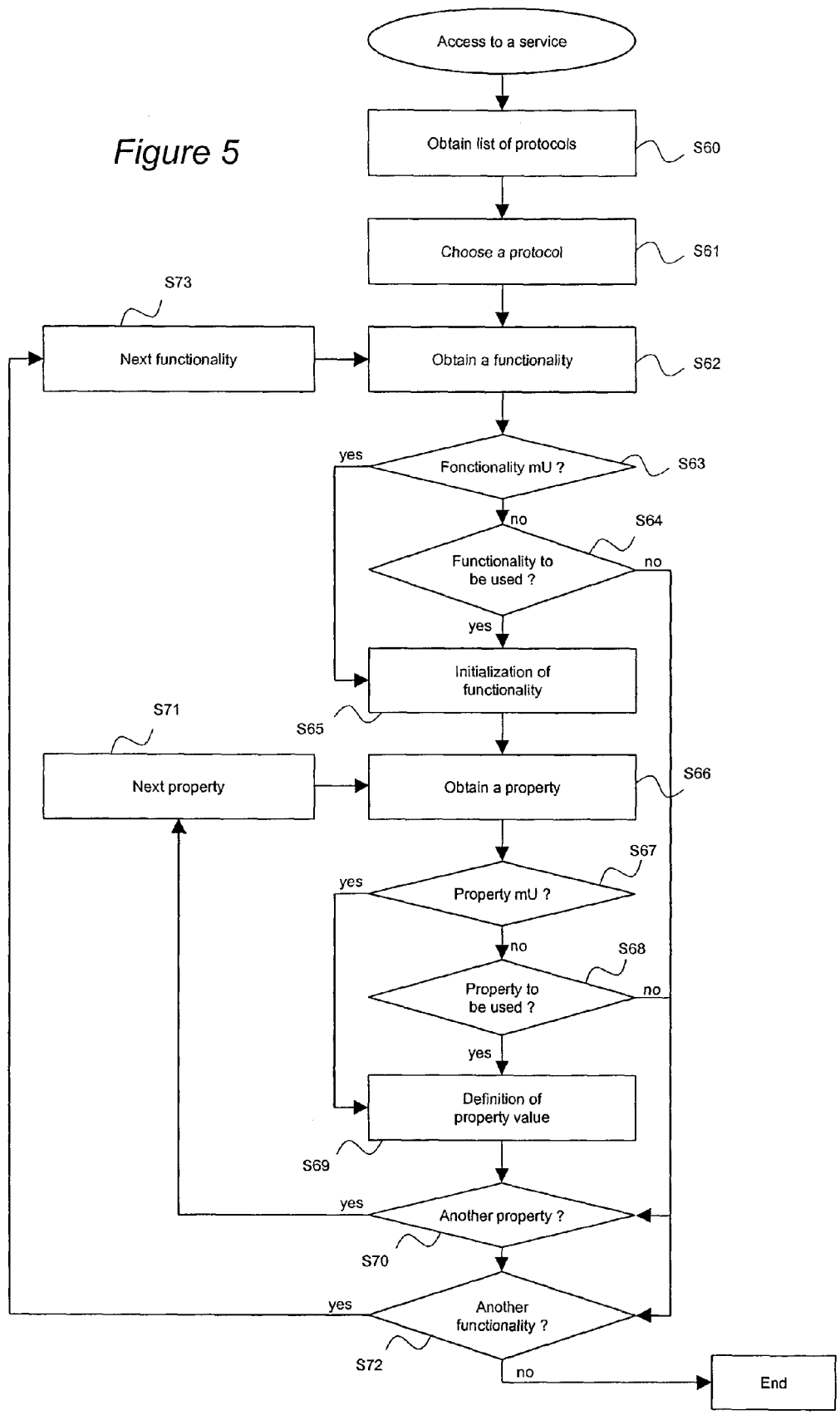
FIG. 5 is an algorithm illustrating a method of access to a service on a communication network.

Thus, as shown in FIG. 5, a method of accessing a service on a communication network may be implemented by the client computer.

An obtaining step S60 makes it possible to obtain the list U of protocols usable as drawn up on implementation of the algorithm for analyzing a document illustrated in FIG. 2.

A choosing step S61 make it possible to identify a communication protocol in that list for the implementation of a service.

In an obtaining step S62, a functionality associated with that protocol is obtained.

In a test step S63 it is verified if that functionality is associated with an attribute mU.

If not, in a test step S64 it is verified whether that functionality is really used by the client computer for the implementation of the service.

If so, an initialization step S65 makes it possible to initialize that functionality.

Similarly, if at the test step S63, that functionality is associated with an attribute mU, the step of initialization of that functionality is also implemented.

In practice, an obtaining step S66 is adapted to obtain a property associated with that functionality.

A test step S67 make it possible to verify if that property is associated with an attribute mU.

These test steps S63 and S67 may be implemented directly on the basis of information stored in the lists P and F drawn up on implementation of the algorithm illustrated in FIG. 3 and stored in the list U of usable protocols.

If at the issue of that test step S67, that property is not associated with an attribute mU having a value "true", it is verified in a test step S68 whether that property is used by the client computer for the implementation of the service.

If it is, a defining step S69 is adapted to give a value to that property.

Similarly, if at the issue of the test step S67, the property identified is associated with an attribute mU set to the value true, the defining step S69 is also implemented on that property.

If, at the issue of the test step S68, the property identified is not used by the client computer for the implementation of the service, it is verified, in a test step S70, whether there is another property associated with the functionality analyzed.

That test step S70 is also implemented at the issue of the step S69, after definition of the value of a property.

If there is another property, a next property is considered in a step S71 and for it the group of steps S66 to S70 is reiterated.

When all the properties associated with the functionality have thus been processed, it is verified in another test step S72 whether another there is another functionality associated with the protocol analyzed.

That test step S72 is also implemented directly at the issue of the test step S64, when the functionality analyzed is not used by the client computer.

If there is another functionality, an step S73 of identifying a next functionality is implemented and the group of steps S62 to S72 are reiterated for the next functionality associated with the communication protocol.

When, at the issue of step S72, all the functionalities have been processed, the algorithm for access to a service terminates.

It is thus found that according to the invention, after analyzing a WSDL document and drawing up the list U of usable protocols including a list F of functionalities, itself describing a list of properties P usable by the client computer, the access to a service via a communication protocol is greatly simplified.

Figure 6:
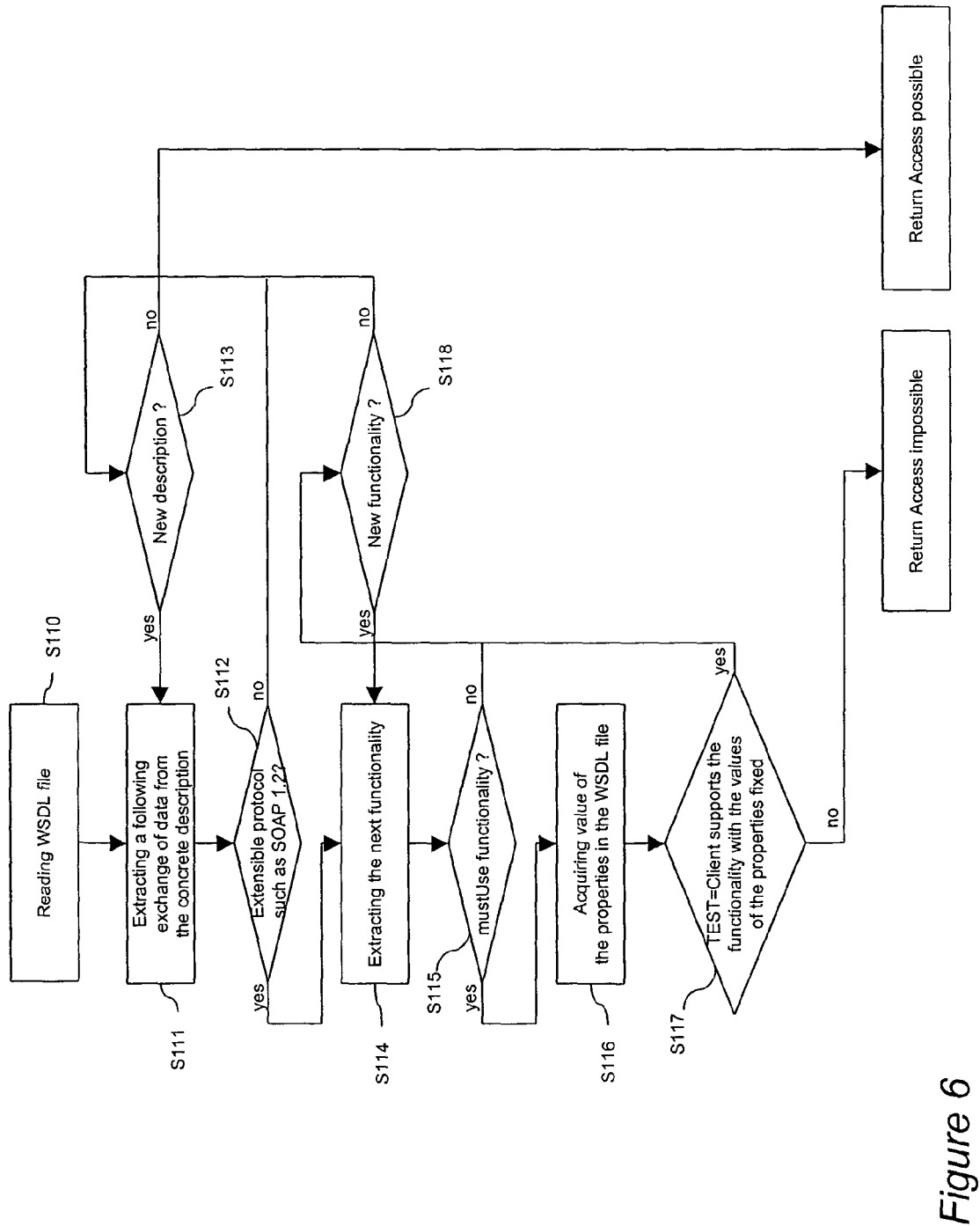
FIG. 6 is an algorithm illustrating the method of testing access to a service in accordance with a fourth aspect of the invention.

A method of testing access to such a service will now be described with reference to FIG. 6.

This method comprises first of all a step S110 of reading a file comprising a description document of a WSDL service.

An extracting step S111 is adapted to extract from the concrete description of this document information on an exchange of data.

A test step S112 makes it possible to verify whether the communication protocol implemented corresponds to an extensible protocol such as SOAP 1.2.

In the negative, it is verified in a test step S113 whether there exists another concrete description included in the descritption document of a WSDL file.

In the negative at step S113, the access test algorithm sends back a response to the effect that the access to the service is possible for the client computer.

On the contrary, if at the issue of the test step S113, a new description is present in the service description document, step S111 and the test step S112 are reiterated. When the protocol described corresponds to the communication protocol SOAP 1.2, an extraction step S114 is implemented to extract a first functionality described in the service description document as previously explained.

The information relating to a functionality implemented by the protocol is thus extracted.

In test step S115 it is verified that the client computer implements that functionality.

The test step S115 is next adapted to verify whether the use of that functionality is mandatory or not on the implementation of the communication protocol for the execution of the service on the communication network.

The test S115 is thus implemented on the basis of an attribute mustUse associated with the functionality adapted to indicate the mandatory use or not of that functionality by a client computer for the execution of the service on the communication network.

In practice, it is verified whether the description of that functionality is associated with an attribute mustUse of which the value is "true".

In the affirmative, an acquisition step S116 makes it possible to acquire at least one mandatory value associated with the functionality on the execution of the service on the communication network.

The acquisition step S116 comprises in practice the acquisition of at least one property associated with the functionality, for example the property "method" and the acquisition of at least one mandatory value associated with that property on the implementation of the communication protocol for the execution of the service.

The value may thus be acquired of the properties which were included in the description document of a WSDL service.

By way of example, by referencing the first example of the document already described, the value GET will be acquired for the "method" property.

In a test step S117 it is verified whether the mandatory value associated with the functionality is supported by the client computer of the communication network.

If the response to this test is negative, a message in response is sent back by the test algorithm to the client computer indicating to it that the access to the service is impossible.

On the contrary, if at the issue of the test step S117, the client computer supports the functionality with the values of mandatory properties fixed, it is verified in a test step S118 that other functionalities exist in the service description.

This test step S118 is also directly implemented when, at the issue of the test S115, the functionality is not associated with an attribute indicating its mandatory use for the implementation of the service.

If there is another functionality, the group of steps S114 to S117 is reiterated.

When all the functionalities have been examined, that is to say that at the issue of the test step S118 the response is negative, the test step S113 is implemented in order to possibly identify a new description of a communication protocol inserted in the service description document.

The group of steps S111 to S118 previously described are then implemented for a second protocol.

Thus, the present invention makes it possible to facilitate the access by a client computer to a service proposed by a server computer of the communication network.

By the analysis of a unique description document, the client computer may automatically know the communication protocol or protocols able to be used by it for accessing a service on the communication network.

A method of verifying compatibility of a communication protocol in accordance with the invention will now be described with reference to FIG. 7.

As previously, this method of verifying compatibility is implemented on the basis of a service description document as previously described, for example a document making it possible for the "web-method" functionality to define a mandatory value "GET" for a "method" property associated with that functionality.

In practice, this method of compatibility verification comprises first of all a step S120 of reading the file comprising a WSDL description document.

An extraction step S121 is adapted to extract an exchange of data from the description.

In a test step S122 it is verified whether it concerns the protocol defined by the SOAP 1.2 standard.

In the negative, a test step S123 is adapted to determine whether there is another description in the WSDL document.

In the affirmative, the steps S121 of extracting and S122 of testing are reiterated on that new description.

When the communication protocol is a protocol defined by the SOAP 1.2 standard, an extraction step S123 is adapted to extract, from the service description document, a functionality implemented by the communication protocol on the execution of the service on the communication network.

An acquisition step S124 next makes it possible to acquire the description of that functionality, for example on the basis of a description in XML language of that functionality as previously described.

This description in XML language makes it possible generally to define the functionality, the property or properties associated with that functionality, as well as the values attributable to those properties.

Next on the basis of the WSDL description document acquisition is made of at least one mandatory value associated with that functionality in the service description document.

In practice, this acquisition step S125 is adapted to acquire at least one mandatory value associated with a property, that property itself being associated with the functionality analyzed.

A test step S126 makes it possible, on the basis of that mandatory value, to verify whether the latter is included in the list of values attributable to that property supported by the functionality.

In the affirmative, a response is sent back to the computer implementing the method of compatibility verification, in order to indicate that the WSDL so analyzed is not valid, since one of the mandatory values associated with a functionality does not correspond to a value attributable to that functionality.

If, at the issue of the test step S126, the mandatory value associated with the functionality, and more particularly included in a list of values attributable to that a property, verification is carried out in a test step S127 of whether another property exists and on this the steps of acquisition S125 and test S126 are reiterated.

In the negative, a test step S128 makes it possible to determine whether other functionalities are included in the description.

In the affirmative, the group of steps S123 to S127 described earlier is reiterated on that new functionality.

In the negative, when all the functionalities of the protocol have been analyzed, the test step S123 is implemented in order to possibly identify a new protocol description inserted in the service description document.

When all the descriptions have been so verified, a message is sent back to the computer implementing the method of compatibility verification in order to validate the description document of a WSDL service.

By virtue of the definition of the functionalities in XML language, it is possible to insert numerous specific functionalities in a communication protocol.

The method of compatibility verification next makes it possible to verify for any type of communication protocol whether it is correctly described and used in the service description document.

Figure 8:
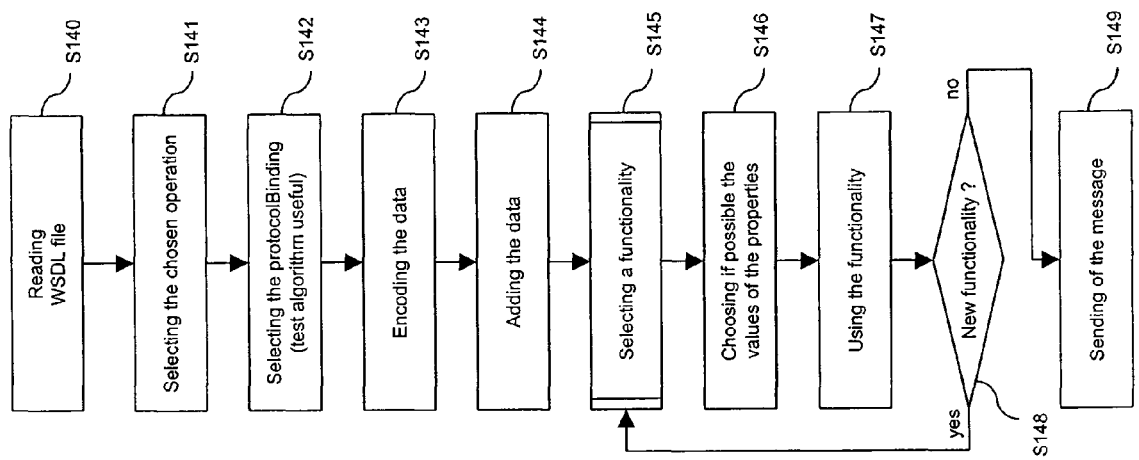
FIG. 8 is an algorithm illustrating a method of constructing a message.

By way of example of the use of the invention, a description will now be given with reference to FIGS. 8 and 9 of an example of construction of a message by a client computer after reception of a service description document as sent during the method of proposing a service described with reference to FIG. 1, and after the implementation of the method of testing access as described in FIG. 6.

A reading step S140 makes it possible first of all to identify a service description document in a WSDL file.

A selecting step S141 is adapted to choose an operation among the operations predefined in the service description document.

A step S142 of selecting a communication protocol is next implemented.

This selection step may advantageously use the results of the access test making it possible to determine the protocols supported by the client computer.

The data having to be inserted in the message are next encoded in an encoding step S143 and then added to the message in an adding step S144.

A selecting step S145 is adapted to select a functionality associated with the communication protocol selected at the selecting step S142.

In practice, in the example embodiment previously described, the functionality or functionalities selected are inserted within the "protocol binding" element.

Figure 9:
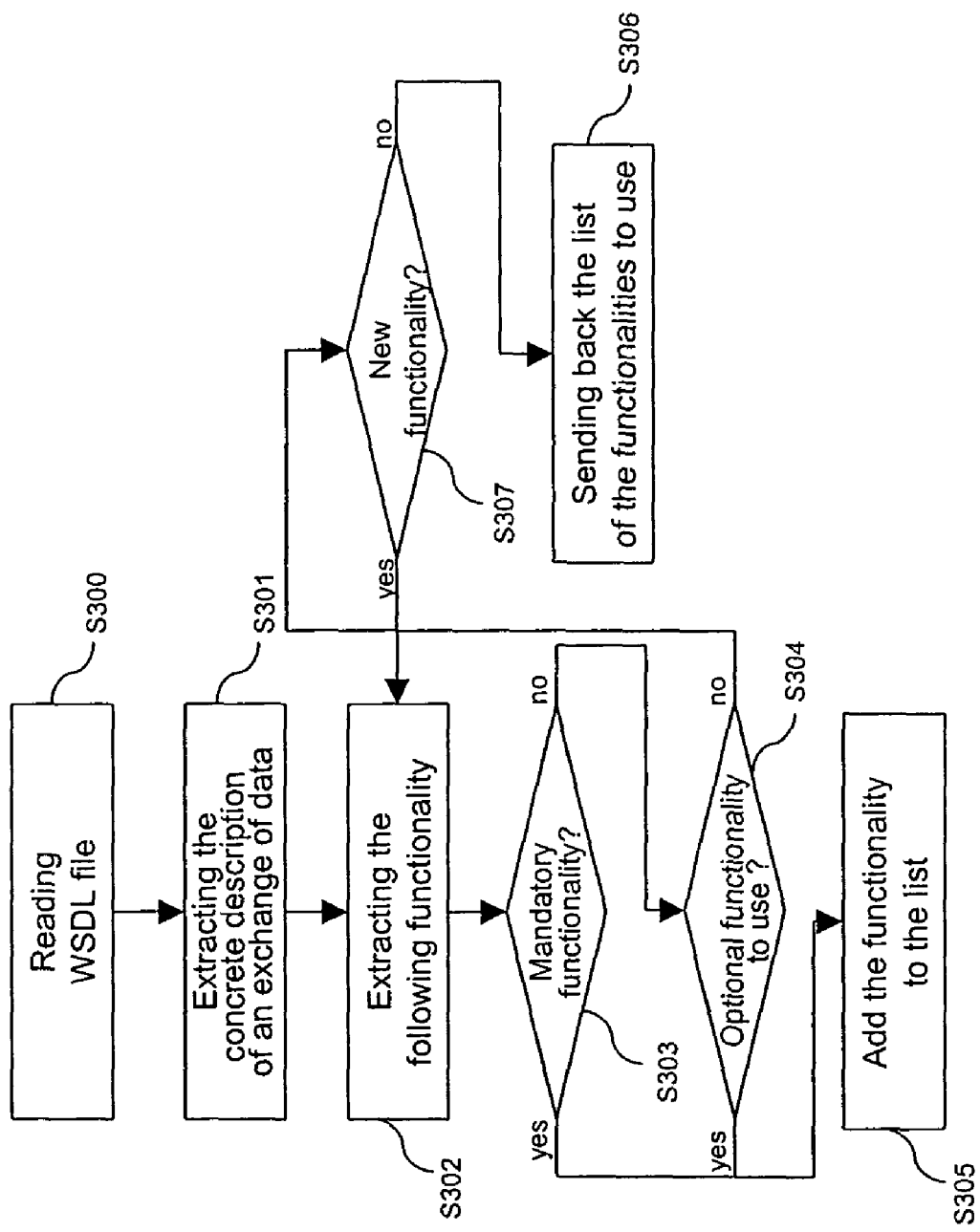
FIG. 9 is an algorithm illustrating the step of selecting a functionality in FIG. 8.

This step of selecting a functionality is detailed in FIG. 9.

On the basis of a step S300 of reading the WSDL document, the concrete description of an exchange of data is extracted in an extracting step S301.

An extracting step S302 makes it possible to identify a first functionality.

In a test step S303 it is verified whether that functionality is mandatory.

In the affirmative, the functionality is added at an adding step S305 to the list of the functionalities to use.

In the opposite case, it is verified in a test step S304 whether the client wishes to use that functionality. If so, at the adding step S305, the functionality is added to the list of functionalities to use.

This test may be implemented on the basis of a direct choice by the client, of client preferences, or of an ad hoc test of the program.

In a test step S307 it is verified whether a following functionality exists. In the affirmative, the steps S302 to S305 are reiterated for that functionality.

When all the functionalities have been processed, a responding step S306 sends back the list of the functionalities to use.

A choosing step S146 next makes it possible, for each functionality of the list so constructed, to determine the mandatory values associated with each property.

If a unique mandatory value is associated with the property, the choice of that value is mandatory.

On the contrary, if a plurality of values are attributable to the property, a choice may be made among those attributable values.

A step S147 of using the functionality is next implemented on the basis of the values previously determined.

In a test step S148, there is possibly identified a new functionality among those selected at the selecting step S145 and for that functionality, the previously described steps of choosing S146 and the step of using S147 are reiterated.

When all the functionalities have thus been used, a step S149 is implemented of sending the message so constructed to the server computer proposing the service in question on the communication network.

In order to implement the method of proposing a service as described with reference to FIG. 1, a device for proposing a service comprises essentially means for sending a service description document comprising information relating to a communication protocol including the description of one or more functionalities, as well as associated properties, and information relating to mandatory values associated with at least one functionality.

Similarly, a device for analysis by a client computer of a communication network of such a description document comprises essentially means for extracting functionalities implemented by a protocol. Verifying means are adapted to verify that each functionality really is supported by the client computer of the communication network and adding means are adapted to add this protocol to a list of protocols usable for the execution of the service provided by the server computer if and only if all the functionalities associated with the communication protocol, and of which the understanding or use are mandatory, really are supported by the client computer.

Furthermore, a device for testing access to a service adapted to implement the method of testing access described with reference to FIG. 6 comprises means for extracting the information relating to at least one functionality implemented by the protocol, testing means adapted to verify whether the use of that functionality is mandatory or not, means for acquiring at least one mandatory value associated with the functionality, preferably making it possible to acquire a mandatory value associated with a property of that functionality, and verifying means making it possible to verify whether the mandatory value associated with the functionality is supported by the client computer of the communication network.

Figure 7:
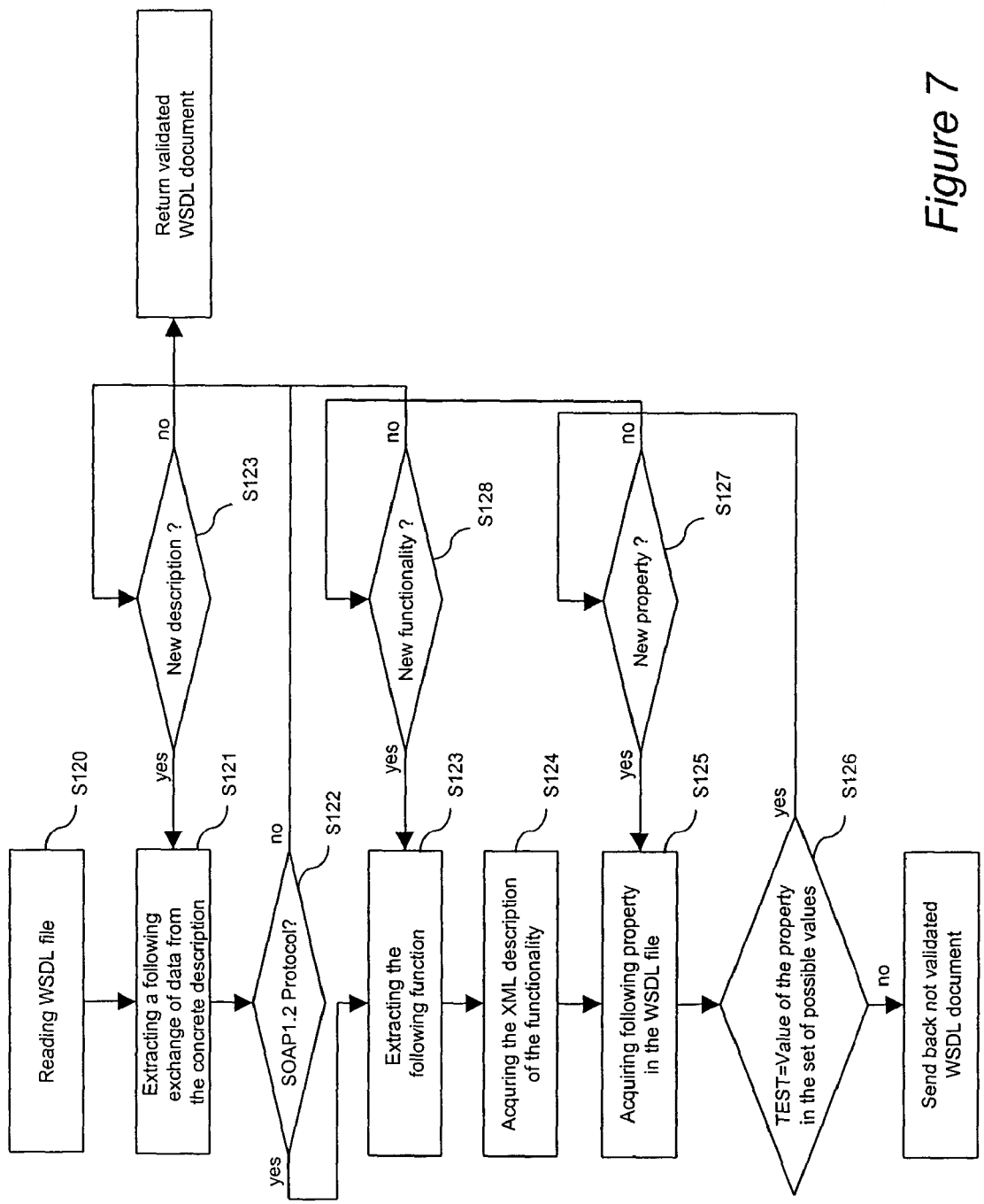
FIG. 7 is an algorithm illustrating the method of verifying compatibility in accordance with a fifth aspect of the invention.

Finally, a device for verifying compatibility adapted to implement the method of verifying compatibility as described in FIG. 7 comprises means for extracting a functionality implemented by the communication protocol, means for acquiring at least one mandatory value associated with that functionality, means for acquiring and for describing that functionality and means for verifying adapted to verify whether the mandatory value is included in a list of values attributable to a property supported by the functionality.

Figure 10:
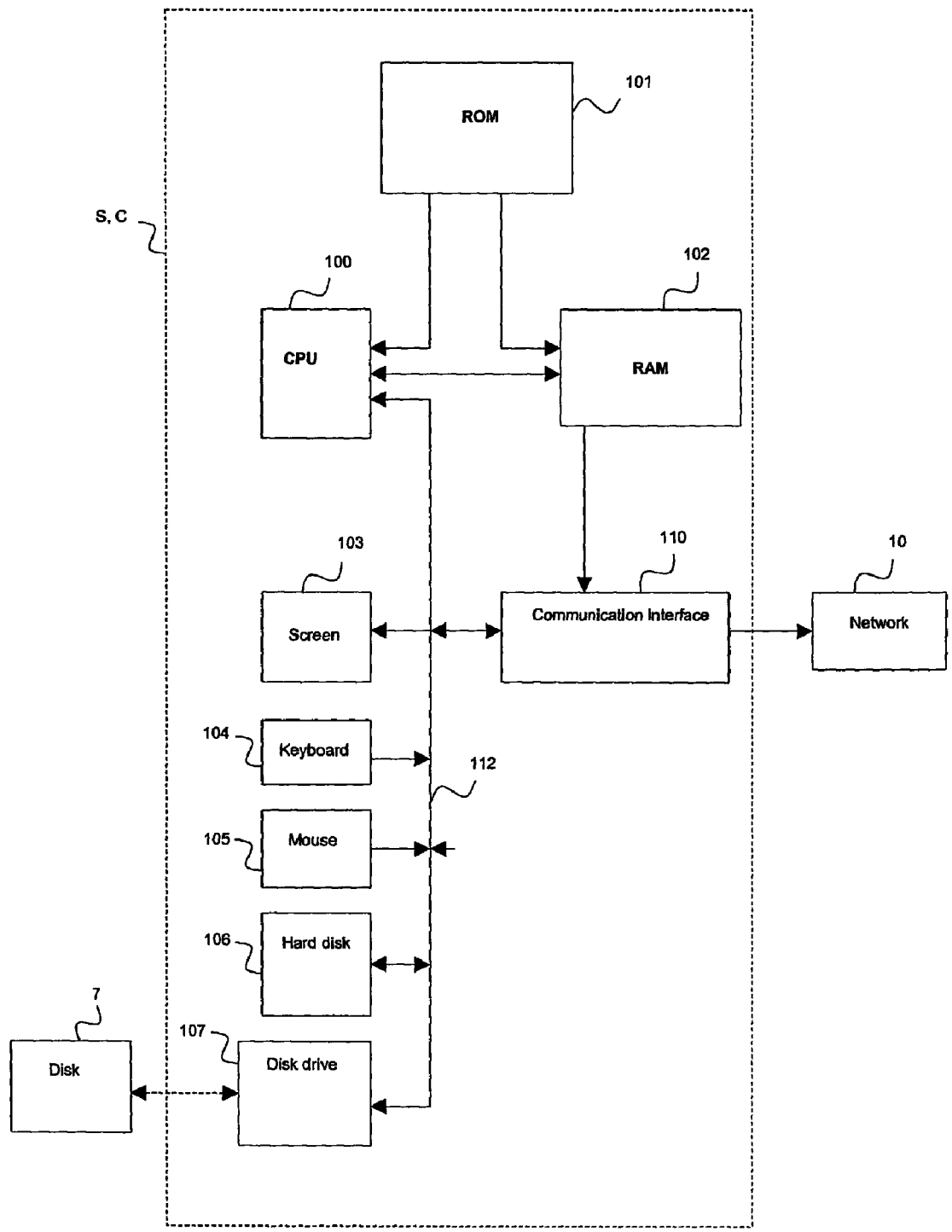
FIG. 10 is a block diagram illustrating a device adapted to implement the invention.

These devices for proposing a service, analyzing a service description document, testing access and verifying compatibility may be incorporated into a computer as illustrated in FIG. 10.

In particular, the device for proposing a service is incorporated into a server computer S of a communication network whereas the device for analyzing a WSDL document and the device for testing access are incorporated into a client computer C of a communication network.

More particularly, the different means identified above may be incorporated in a microprocessor 100, a read-only memory (or ROM) 101 being adapted to store a program for proposing a service and/or analyzing a document and/or testing access and/or verifying compatibility.

Of course, these devices for proposing a service or analyzing a service description document may be implemented in the same computer or else in different stations of the communication network.

A Random access memory (or RAM) 102 is adapted to store in registers the values modified during execution of the programs.

The microprocessor 100 is integrated into a computer which may be connected to different peripherals and to other computers of the communication network 10. In particular, that computer corresponds to a server computer S or to a client computer C of that communication network 10.

That computer S, C comprises in known manner a communication interface 110 connected to the communication network to receive or transmit messages.

The computer further comprises means for storage of documents, such as a hard disk 106 or is adapted to cooperate by means of a disk drive 107 (diskettes, compact discs or computer cards) with removable document storage means such as disks 7. These fixed or removable storage means may comprise the code of the methods according to the invention.

They are also adapted to store a service description electronic document as defined by the present invention.

As a variant, the program enabling the devices for proposing a service, for analyzing a description document, for testing access or for verifying compatibility to implement the invention, can be stored in the read only memory 101.

As a second variant, the program can be received and stored as described previously by means of the communication network 10.

The computer S, C also has a screen 103 which may for example serve as an interface with an operator with the use of the keyboard 104 or the mouse 105 or of any other means.

The central processing unit 100 (CPU) will then execute the instructions relating to the implementation of the invention. On powering up, the programs and methods relating to the invention, stored in a non-volatile memory, for example the read-only memory 101, are transferred into the random-access memory 102, which will then contain the executable code of the invention as well as the variables necessary for implementing the invention.

The communication bus 112 affords communication between the different sub-elements of the computer 10 or connected to it.

The representation of the bus 112 is not limitative and in particular the microprocessor 100 is able to communicate instructions to any sub-element directly or by means of another sub-element.

Naturally, numerous modifications can be made to the example embodiments described above without departing from the scope of the invention.

The invention claimed is:

1. A method of proposing a service provided by a server computer in a communication network, comprising:

sending to a client computer, a WSDL (Web Services Description Language) document comprising information relating to SOAP (Simple Object Access Protocol)

communication protocol used for transporting messages to be exchanged over the communication network, at least one message being exchanged while accessing, by the client computer, said service provided by the server computer, said SOAP communication protocol comprising mandatory and optional and/or additional functionalities, said WSDL document including a description comprising an indication specifying that at least one functionality of said optional and/or additional functionalities of the SOAP communication protocol is necessary in order to exchange said at least one message using the SOAP communication protocol.

2. A method of proposing a service according to claim 1, wherein the description comprising the indication specifying that said at least one functionality of said optional and/or additional functionalities is necessary in order to exchange the at least one message using the SOAP communication protocol is included by reference in the WSDL document.

3. A method of proposing a service according to claim 1, wherein the description comprising the indication specifying that said at least one functionality of said optional and/or additional functionalities is necessary in order to exchange the at least one message using the SOAP communication protocol comprises a list of properties supported by said at least one functionality.

4. A method of proposing a service according to claim 3, wherein for at least one property supported by said at least one functionality, the description comprising the indication specifying that said at least one functionality is necessary in order to exchange the at least one message using the SOAP communication protocol comprises a list of values attributable to said property.

5. A method of proposing a service according to claim 3, wherein at least one property is associated with an attribute adapted to indicate the understanding of that property by the client computer is mandatory on implementation of the SOAP communication protocol for the execution of said service on the communication network.

6. A method of proposing a service according to claim 3, wherein each property is associated with an attribute adapted to indicate the use of that property by the client computer is mandatory on implementation of the SOAP communication protocol for the execution of said service on the communication network.

7. A method of proposing a service according to claim 1, wherein the description comprising the indication specifying that said at least one functionality of said optional and/or additional functionalities is necessary in order to exchange the at least one message using the SOAP communication protocol is associated with an attribute adapted to indicate the understanding of said at least one functionality by the client computer is mandatory on implementation of the SOAP communication protocol for the execution of said service on the communication network.

8. A method of proposing a service according to claim 1, wherein the description comprising the indication specifying that said at least one functionality of said optional and/or additional functionalities is necessary in order to exchange the at least one message using the SOAP communication protocol is associated with an attribute adapted to indicate the use of said at least one functionality by the client computer is mandatory on implementation of the SOAP communication protocol for the execution of said service on the communication network.

9. A method of proposing a service according to claim 1, wherein the WSDL document is written in a markup language, said functionalities being described respectively in child tags included in a tag referencing a communication protocol.

10. A method of proposing a service according to claim 1, wherein the functionalities are chosen from types of functionality defined by the SOAP protocol for information exchange.

11. A method of proposing a service according to claim 1, wherein the WSDL document is a document comprising a first part including information relating to the messages exchanged on the execution of said service, and a second part including information relating to at least one communication protocol implemented on execution of said service, and the description comprising the indication specifying that said at least one functionality of said optional and/or additional functionalities is necessary in order to exchange the at least one message using the SOAP communication protocol is included in said second part of the WSDL document.

12. A method of proposing a service according to claim 1, wherein said at least one functionality of said optional and/or additional functionalities is described by a local reference of the server computer or by a (Uniform Resource Identifier) URI.

13. A non-transitory storage medium, readable by a computer, on which is stored computer-executable code for a program readable by a microprocessor to implement the method of proposing a service according to claim 1.

14. A method of proposing a service according to claim 1, said WSDL document further comprising information relating to mandatory values associated with said at least one functionality of said optional and/or additional functionalities.

15. A method of proposing a service according to claim 14, said at least one functionality of said optional and/or additional functionalities supporting at least one property, wherein the WSDL document comprises information relating to at least one mandatory value associated respectively with each property of said at least one functionality.

16. A method of proposing a service according to claim 14, wherein said at least one functionality of said optional and/or additional functionalities is associated with an attribute adapted to indicate that use of said at least one functionality by the client computer is mandatory on the implementation of the SOAP communication protocol for the execution of said service on the communication network.

17. A method of proposing a service according to claim 14, wherein the WSDL document is written in a markup language, said information relating to mandatory values being included in a tag referencing a functionality of said SOAP communication protocol.

18. A method of proposing a service according to claim 14, wherein the WSDL document is a document comprising a first part including information relating to the messages exchanged on the execution of said service, and a second part including information relating to at least one communication protocol implemented on the execution of said service, and said information relating to mandatory values is included in said second part of the WSDL document.

19. A non-transitory storage medium, readable by a computer, on which is stored computer-executable code for a program readable by a microprocessor to implement the method of proposing a service according to claim 14.

20. A method of analyzing, by a client computer of a communication network, a Web Services Description Language (WSDL) document sent by a server computer, said server computer proposing said service, the method comprising the steps of:

extracting a description of functionalities implemented by a SOAP (Simple Object Access Protocol) communication protocol for transporting messages from the WSDL document;

verifying that each functionality is supported by the client computer of the communication network; and adding said SOAP communication protocol to a list of protocols usable for the execution of a service supplied by the server computer if all the functionalities associated with the SOAP communication protocol are supported by the client computer, wherein, the WSDL document comprises information relating to the SOAP communication protocol used for transporting the messages to be exchanged over the communication network, at least one message being exchanged while accessing, by the client computer, said service provided by said server computer, said SOAP communication protocol comprising mandatory and optional and/or additional functionalities, said WSDL document including the description comprising an indication specifying that at least one functionality of said optional and/or additional functionalities of the SOAP communication protocol is necessary in order to exchange said at least one message using the SOAP communication protocol.

21. A non-transitory storage medium, readable by a computer, on which is stored computer-executable code for a program readable by a microprocessor to implement the analyzing method according to claim 20, when it is loaded and executed by the microprocessor.

22. A device for proposing a service provided by a server computer in a communication network, comprising;

sending means for sending, to a client computer, a WSDL (Web Services Description Language) document comprising information relating to SOAP (Simple Object Access Protocol) communication protocol used for transporting messages to be exchanged over the communication network, at least one message being exchanged while accessing, by said client computer, said service provided by said server computer, said SOAP communication protocol comprising mandatory and optional and/or additional functionalities, said WSDL document including a description comprising an indication specifying that at least one functionality of said optional and/or additional functionalities of the SOAP communication protocol is necessary in order to exchange said at least one message using the SOAP communication protocol.

23. A device for proposing a service according to claim 22, said WSDL document further comprising information relating to mandatory values associated with said at least one functionality of said optional and/or additional functionalities.

24. A device for analyzing, by a client computer of a communication network, a WSDL (Web Services Description Language) document sent by a server computer, the server computer proposing the service, comprising:

extracting means for extracting a description of functionalities implemented by SOAP (Simple Object Access Protocol) communication protocol for transporting messages from the WSDL document;

verification means for verifying if each functionality is supported by the client computer of the communication network; and adding means for adding said SOAP communication protocol to a list of protocols usable for the execution of a service supplied by the server computer if all the functionalities associated with the SOAP communication protocol are supported by the client computer, wherein, the WSDL document comprises information relating to the SOAP communication protocol used for transporting the messages to be exchanged over the communication network, at least one message being exchanged while accessing, by the client computer, said service provided by said server computer, said SOAP communication protocol comprising mandatory and optional and/or additional functionalities, said WSDL document including the description comprising an indication specifying that at least one functionality of said optional and/or additional functionalities of the SOAP communication protocol is necessary in order to exchange said at least one message using the SOAP communication protocol.

25. A system for proposing a service via a communication network, comprising:

a server computer for proposing a service provided by the server computer via the communication network; and a client computer for analyzing a WSDL (Web Services Description Language) document sent by the server computer, wherein the server computer comprises:

sending means for sending, to the client computer, the WSDL document comprising information relating to SOAP (Simple Object Access Protocol) communication protocol used for transporting messages to be exchanged over the communication network, at least one message being exchanged while accessing, by said client computer, said service provided by said server computer, said SOAP communication protocol comprising mandatory and optional and/or additional functionalities, said WSDL document including a description comprising an indication specifying that at least one functionality of said optional and/or additional functionalities of the SOAP communication protocol is necessary in order to exchange said at least one message using the SOAP communication protocol, and wherein said client computer comprises:

extracting means for extracting the description of functionalities implemented by the SOAP communication protocol for transporting the messages from the WSDL document;

verification means for verifying if each functionality is supported by the client computer of the communication network; and adding means for adding said SOAP communication protocol to a list of protocols usable for the execution of a service supplied by the server computer if all the functionalities associated with the SOAP communication protocol are supported by the client computer.

* * * * *